UNITED STATES PATENT OFFICE.

ARTHUR H. BAILEY, OF NEWTON, MASSACHUSETTS.

CLAM EXTRACT.

SPECIFICATION forming part of Letters Patent No. 395,199, dated December 25, 1888.

Application filed November 12, 1888. Serial No. 290,605. (No specimens.)

*To all whom it may concern:*

Be it known that I, ARTHUR H. BAILEY, of Newton, in the county of Middlesex and State of Massachusetts, have invented certain new and useful Improvements in Clam Extracts, of which the following is a specification.

This invention has for its object to produce a liquid clam extract, which shall be nutritious, palatable, and in compact form, and shall possess all the liquid nutritive properties of the clam.

To this end the invention consists in the improved product, which I will now proceed to describe and claim.

In carrying out my invention I place the uncooked clams in a retort or receptacle which is preferably air and steam tight, and admit live steam into said retort for twenty minutes, or more or less, as may be desired.
The steam causes the shell or clam to open, thus liberating the liquid or juice from the solid meat of the clams, and said liquid drops into suitable pans placed for the purpose under the clams, the latter being supported by suitable open racks or gratings. The juice or liquid extract thus obtained is next passed through a suitable filter, and is then boiled to evaporate a part of the water and concentrate the extract, thus making a given quantity of it richer than it would otherwise be. The boiling also cooks the nutritive elements in the liquid sufficiently to prevent ready decomposition when exposed to the air. The liquid is finally put, either hot or cold, into cans or jars, and is subsequently additionally heated or cooked therein, so as to exclude the air and enable the product to keep in any climate. The cans are hermetically sealed when the liquid therein is hot.

The extract thus made is rich in nutriment and is at the same time easily assimilated, so that it is a valuable tonic for people with weak or impaired digestive organs, and as an article of food, either alone or combined with water, milk, or liquors. It is superior to any other as a tonic for nursing mothers, and as a remedy for kidney difficulties, dyspepsia, indigestion, constipation, gastric or malarial troubles, patients recovering from fevers, or those reduced by excessive dissipation or overwork. No added salt is required, the saline properties of the clam being fully retained and sufficient to flavor the extract.

The process of making this improved clam extract forms the subject of another application for patent filed by me September 17, 1888, Serial No. 285,603.

I claim—

The improved liquid clam extract, consisting of clam-juice liberated from uncooked clams by steam and subsequently filtered and boiled, as set forth.

In testimony whereof I have signed my name to this specification, in the presence of two subscribing witnesses, this 6th day of November, A. D. 1888.

ARTHUR H. BAILEY.

Witnesses:
C. F. BROWN,
ARTHUR W. CROSSLEY.